(12) United States Patent
Amend

(10) Patent No.: US 9,057,196 B2
(45) Date of Patent: *Jun. 16, 2015

(54) SUBFLOOR COMPONENT AND METHOD OF MANUFACTURING SAME

(71) Applicant: Victor Amend, Toronto, CA (US)

(72) Inventor: Victor Amend, Toronto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/456,053

(22) Filed: Aug. 11, 2014

(65) Prior Publication Data

US 2014/0345222 A1    Nov. 27, 2014

Related U.S. Application Data

(63) Continuation-in-part of application No. 14/028,703, filed on Sep. 17, 2013, which is a continuation-in-part of application No. 13/412,038, filed on Mar. 5, 2012, now Pat. No. 8,650,823.

(51) Int. Cl.
| | | |
|---|---|---|
| *E04C 1/00* | (2006.01) | |
| *E04F 15/02* | (2006.01) | |
| *E04F 15/10* | (2006.01) | |
| *E04B 1/66* | (2006.01) | |
| *B05D 1/02* | (2006.01) | |
| *B32B 38/10* | (2006.01) | |
| *E04F 15/18* | (2006.01) | |
| *B32B 37/12* | (2006.01) | |
| *B32B 38/00* | (2006.01) | |

(52) U.S. Cl.
CPC .......... *E04F 15/02038* (2013.01); *E04F 15/102* (2013.01); *E04F 15/107* (2013.01); *E04F 15/02161* (2013.01); *E04B 1/66* (2013.01); *B05D 1/02* (2013.01); *B32B 38/10* (2013.01); *B32B 2307/7265* (2013.01); *B32B 2325/00* (2013.01); *Y10T 156/1064* (2015.01); *E04F 15/185* (2013.01); *B32B 37/12* (2013.01); *B32B 38/0004* (2013.01); *B32B 2419/04* (2013.01); *B32B 2607/00* (2013.01)

(58) Field of Classification Search
CPC . E04F 15/102; E04F 15/02038; E04F 15/185; E04F 15/02161; E04F 15/107; E04B 1/66; E04B 1/665; B32B 38/10; B32B 37/12; E04C 2/284; B05D 1/02
USPC ............ 52/302.1, 302.3, 302.4, 403.1, 309.4, 52/309.8, 408–410, 413, 169.5, 169.14, 52/385–386, 389, 789.1; 428/156, 158, 428/167, 172, 220, 318.4, 318.8
See application file for complete search history.

(56) References Cited

U.S. PATENT DOCUMENTS

| | | | | |
|---|---|---|---|---|
| 4,945,697 | A | * | 8/1990 | Ott et al. ...................... 52/403.1 |
| 5,671,575 | A | * | 9/1997 | Wu ............................... 52/403.1 |
| 5,694,730 | A | * | 12/1997 | Del Rincon et al. ......... 52/586.1 |
| 5,695,870 | A | * | 12/1997 | Kelch et al. ................. 428/318.4 |
| 5,860,259 | A | * | 1/1999 | Laska ........................... 52/302.3 |
| 6,468,629 | B1 | * | 10/2002 | Lodder ......................... 428/158 |

(Continued)

*Primary Examiner* — Beth Stephan
(74) *Attorney, Agent, or Firm* — Renner Kenner Greive Bobak Taylor & Weber

(57) ABSTRACT

A subfloor component includes a hardboard panel having first and second opposing faces and a plurality of intersecting grooves to define, in cross-section, a plurality of pedestals having walls that extend into the panel from the first face toward the second face. The subfloor component also includes a film of substantially moisture-impervious material attached to the first face of the panel and that conforms to the tops and walls of the pedestals and to the bottoms of the grooves.

20 Claims, 17 Drawing Sheets

(56) References Cited

U.S. PATENT DOCUMENTS

| | | | |
|---|---|---|---|
| 6,607,803 B2* | 8/2003 | Foster | 428/77 |
| 6,918,215 B2* | 7/2005 | Smith | 52/177 |
| 8,769,895 B2* | 7/2014 | Amend | 52/309.8 |
| 2005/0158517 A1* | 7/2005 | Rives et al. | 428/158 |
| 2007/0062139 A1* | 3/2007 | Jones et al. | 52/403.1 |
| 2008/0034690 A1* | 2/2008 | Gartz et al. | 52/302.3 |
| 2008/0066419 A1* | 3/2008 | Stanchfield et al. | 52/716.1 |
| 2008/0086958 A1* | 4/2008 | Schroer et al. | 52/169.14 |
| 2009/0126307 A1* | 5/2009 | Grohman et al. | 52/588.1 |
| 2011/0045250 A1* | 2/2011 | De Zen | 428/168 |
| 2011/0197543 A1* | 8/2011 | Lee et al. | 52/745.05 |

* cited by examiner

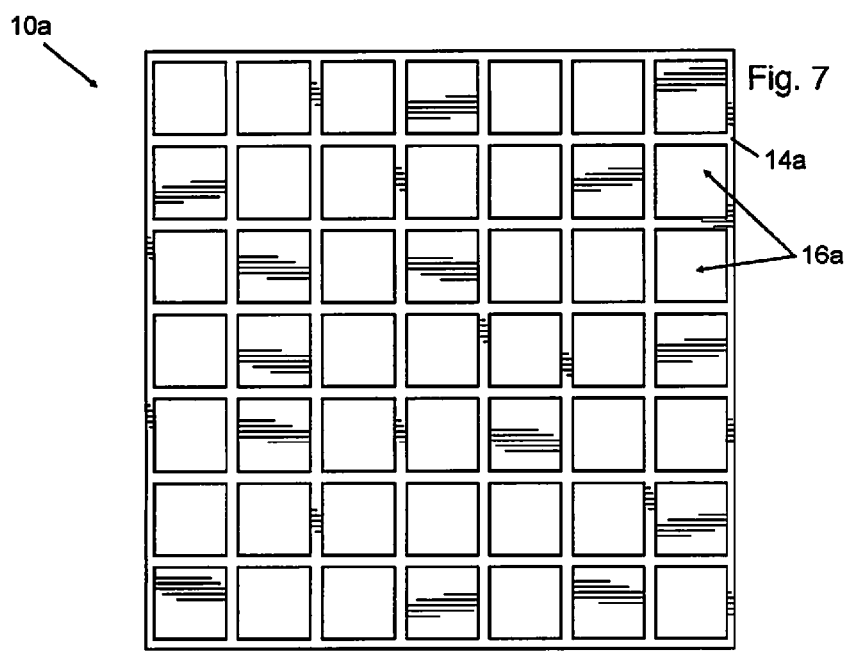
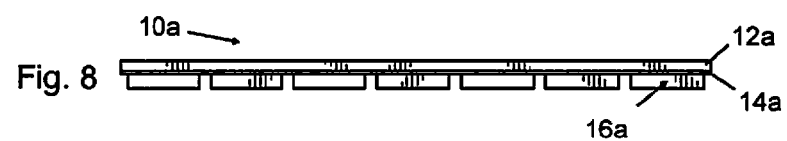

SUBFLOOR COMPONENT AND METHOD OF MANUFACTURING SAME

CROSS-REFERENCE TO RELATED APPLICATIONS

This application is a continuation-in-part of U.S. patent application Ser. No. 14/028,703 filed on Sep. 17, 2013, which is a continuation-in-part of U.S. patent application Ser. No. 13/412,038 filed on Mar. 5, 2012, the contents of which are incorporated herein by reference in their entireties.

FIELD OF THE INVENTION

The following is directed in general to building construction and renovation, and more particularly to a subfloor component and a method of manufacturing a subfloor component.

BACKGROUND OF THE INVENTION

A subfloor component is a panel or other component meant to be placed on top of a concrete floor or other foundation before a finished floor of, for example, hardwood or tile is installed. The subfloor component may have projections for permitting the flow of moisture underneath the component so as to prevent moisture from standing underneath the subfloor component and causing problems with mold. While subfloor components of varying types are known, improvements are desirable.

SUMMARY OF THE INVENTION

According to an aspect, there is provided a subfloor component comprising: a hardboard panel having first and second opposing faces and a plurality of intersecting grooves to define, in cross-section, a plurality of pedestals having walls that extend into the panel from the first face toward the second face; and a film of substantially moisture-impervious material attached to the first face of the panel and that conforms to the tops and walls of the pedestals and to the bottoms of the grooves.

Advantageously, the subfloor component has a moisture-resistant film that conforms to the pedestals of the panel, such the when the pedestals are facing downwards against, for example, a concrete floor, moisture can travel along the concrete floor between the pedestals (ie. along channels formed by the grooves of the panel and the concrete floor) without seeping into the hardboard panel.

Enabling the moisture to travel along the channels enables drainage of the moisture that is on the concrete floor below the subfloor component towards the edges of the subfloor components, rather than form standing-water puddles on the concrete floor.

The attaching of the moisture-resistant film to the pedestals of the panel provides structural integrity to the hardboard panel. Thus, while a subfloor component is being transported, or while the subfloor component is being compressed against, for example, a concrete floor during normal use, the panel does not tend to break. In other words, the moisture-resistant film, in addition to preventing ingress of moisture into the panel, tends to keep the pedestals intact.

The second surface of the hardboard panel provides a flat, integrated surface upon which to overlay further flooring made of wood, linoleum, ceramic, stone, cork, bamboo, eucalyptus or other material.

Multiple subfloor components may be installed on a concrete floor simply by setting them down on a concrete floor adjacent to each other, or even somewhat spaced from each other. However, in one embodiment, each subfloor component is shaped to connect to another subfloor component by way of tongues and grooves on respective sides of the hardboard panel. The subfloor components that are so interconnected can provide an overall more uniform surface flatness across subfloor components and discourage shifting of the subfloor components. This can be useful for overlaying further flooring. Other structures for interconnecting subfloor components may be employed. For example, pieces of dowel may be inserted into holes in the sides of the hardboard panels that are being installed adjacent to each other, with the dowel spanning between the adjacent subfloor components.

The film may be attached to the panel by an adhesive layer. The film may be fused to the panel. The film may be spray coated onto the panel. The film may comprise material selected from the group comprising plastic or polymer. The plastic or polymer may be selected from the group consisting of: high-impact polystyrene, polyethylene, polypropylene, and ABS (Acrylonitrile Butadiene Styrene).

Each of the plurality of pedestals may have a single wall. The pedestals may be shaped as circles or ellipses.

The intersecting grooves may be rectangular. The pedestals may be shaped as at least one of circles, ellipses, rectangles, diamonds, squares, and hexagons.

The pedestals may be generally uniformly distributed across the first surface of the panel.

The hardboard panel may comprise material selected from the group consisting of: OSB (oriented strand board), plywood, fiber cement board, cement board, and magnesium oxide board.

The subfloor component may be shaped to connect to another subfloor component. The hardboard panel may comprise a tongue/groove configuration for connecting to another hardboard panel of another subfloor component.

The hardboard panel may include a groove that is open along a side-facing surface of the hardboard panel, and further comprising: a connector dimensioned to insert into the groove. The connector may comprise: a central body; and tongues extending outwards from the central body, wherein each tongue is dimensioned to be inserted into a respective groove in a hardboard panel of a subfloor component.

In another aspect, there is provided a method of manufacturing a subfloor component, comprising: shaping a hardboard sheet to form a hardboard panel having, in cross-section, a plurality of pedestals with walls that extend into the panel from a first face of the panel toward a second opposing face of the panel; and attaching a substantially moisture-impervious film to the first face of the panel, the film conforming to the tops and walls of the pedestals and to the bottoms of the grooves.

Attaching the film may comprise: adhering the film to the first face of the panel using an adhesive layer. The method may further comprise: disposing an adhesive layer on one or both of the film and the first face of the panel. Attaching the film may comprise: spray coating the film onto the first face of the panel. Attaching the film may comprise: placing the film adjacent the first face of the panel; and applying heat to one or both of the film and the panel, so as to cause the film to enter into and conform to the pedestals and fuse thereto. The placing may comprise placing the film in contact with and/or in non-contact proximity with the first face of the panel.

The method may further comprise: shaping the hardboard layer with a tongue/groove configuration for connecting to another hardboard layer of another subfloor component.

The method may further comprise: forming grooves on at least two sides of said hardboard layer, each groove for connecting to at least one connector.

BRIEF DESCRIPTION OF THE DRAWINGS

Embodiments will now be described more fully with reference to the accompanying drawings in which:

FIG. 7 is a bottom view of the subfloor component of FIG. 6;
FIG. 8 is a side view of the subfloor component of FIG. 6.

DETAILED DESCRIPTION OF THE EMBODIMENTS

Figure 1:
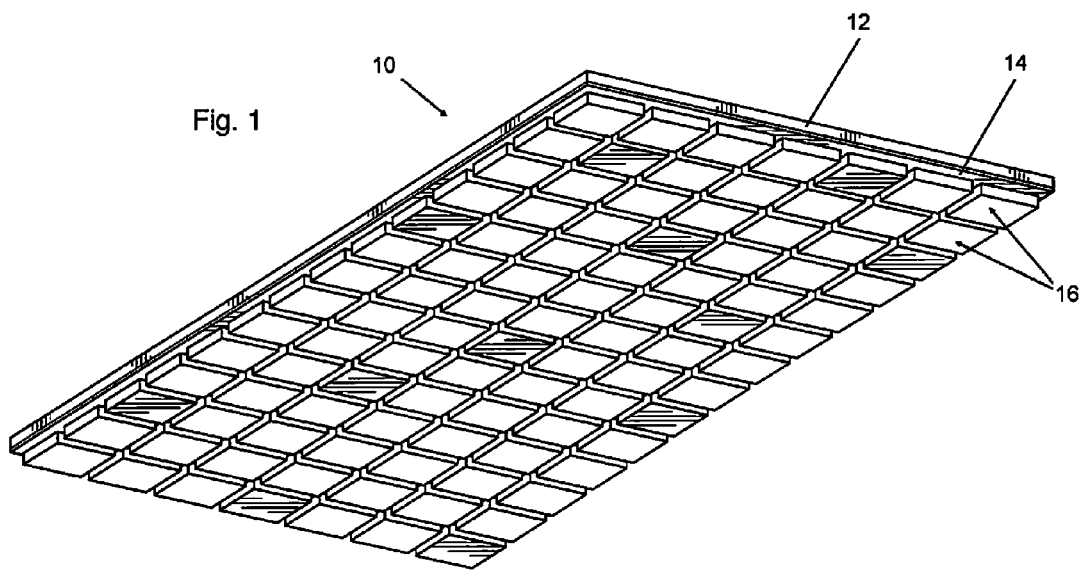
FIG. 1 is a perspective view of the underside of one embodiment of a subfloor component.
Figure 2:
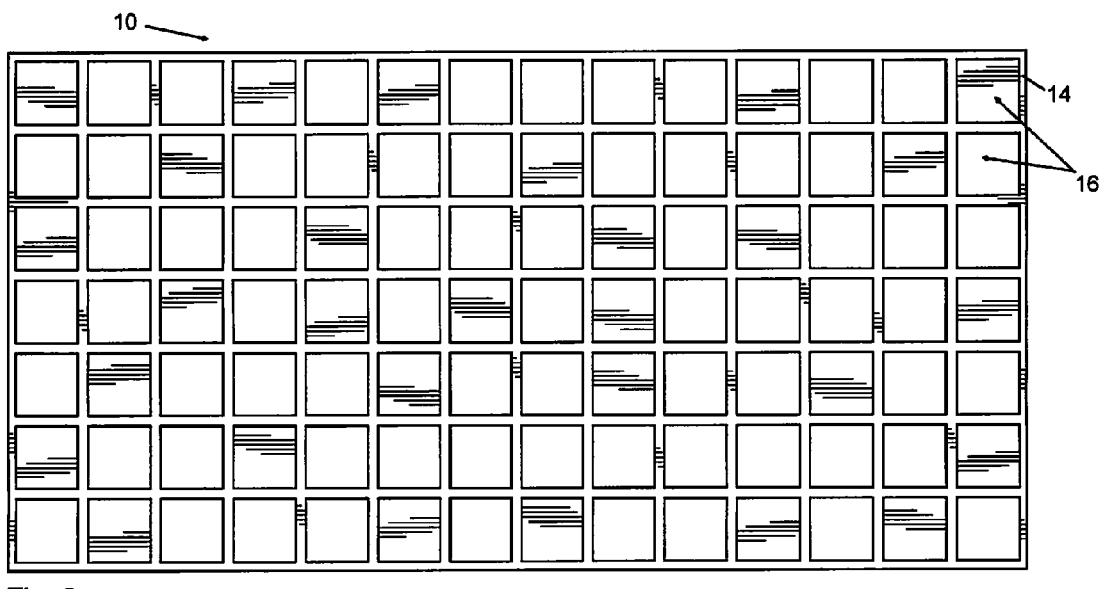
FIG. 2 is a bottom view of the subfloor component of FIG. 1.
Figure 3:
FIG. 3 is a side view of the subfloor component of FIG. 1.
Figure 4:
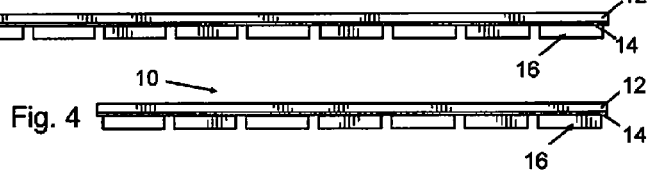
FIG. 4 is an end view of the subfloor component of FIG. 1.
Figure 5:
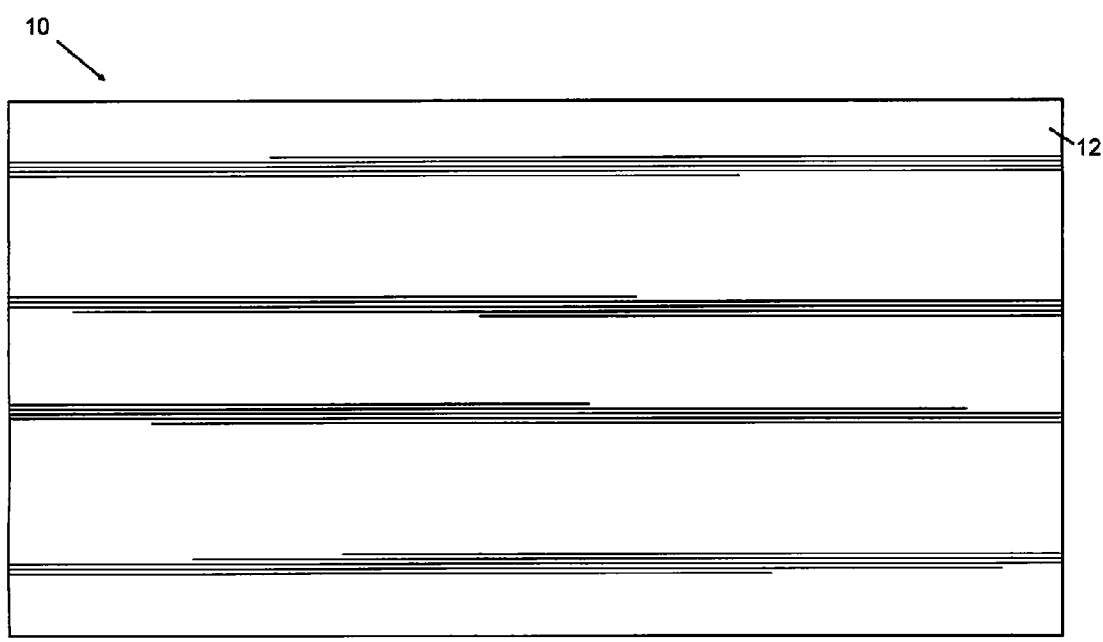
FIG. 5 is a top view of the subfloor component of FIG. 1.
Figure 6:
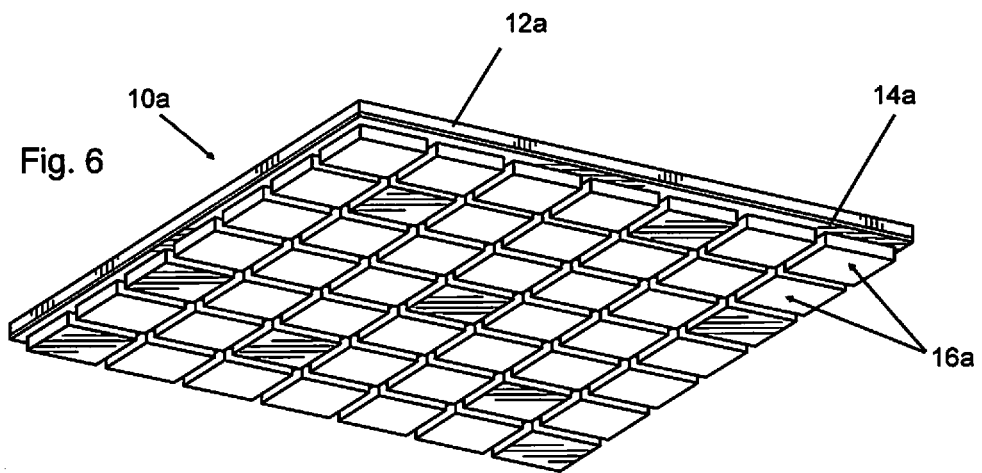
FIG. 6 is a perspective view of the underside of another embodiment of a subfloor component.
Figure 9:
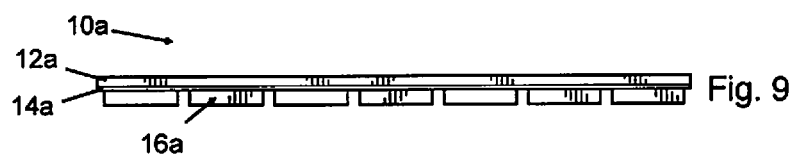
FIG. 9 is an end view of the subfloor component of FIG. 6.
Figure 10:
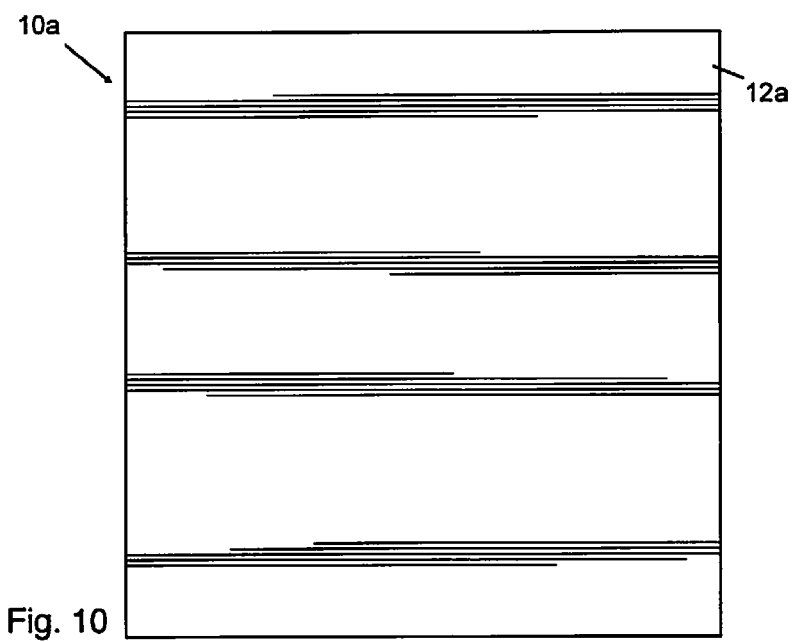
FIG. 10 is a top view of the subfloor component of FIG. 6.
Figure 11:
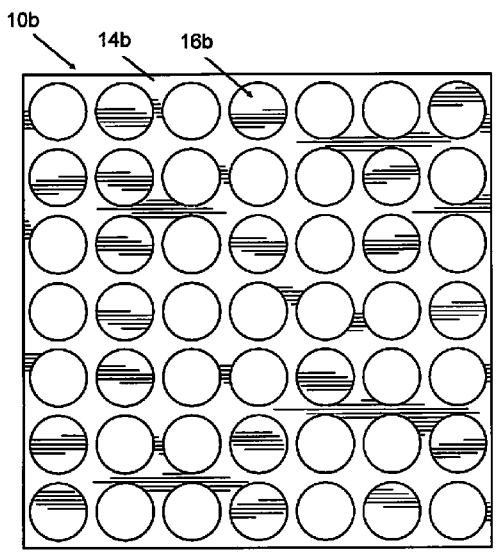
FIG. 11 is a bottom view of another embodiment of a subfloor component.
Figure 12:
FIG. 12 is a side view of the subfloor component of FIG. 11.
Figure 13:
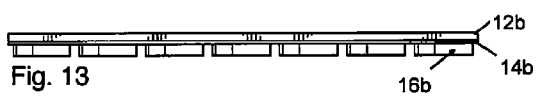
FIG. 13 is an end view of the subfloor component of FIG. 11.
Figure 14:
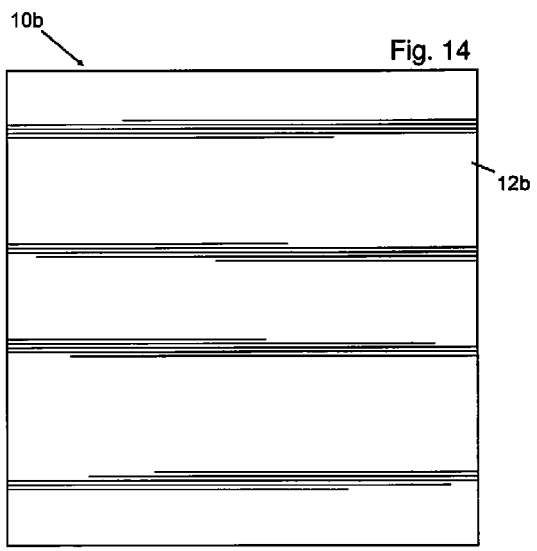
FIG. 14 is a top view of the subfloor component of FIG. 11.
Figure 15:
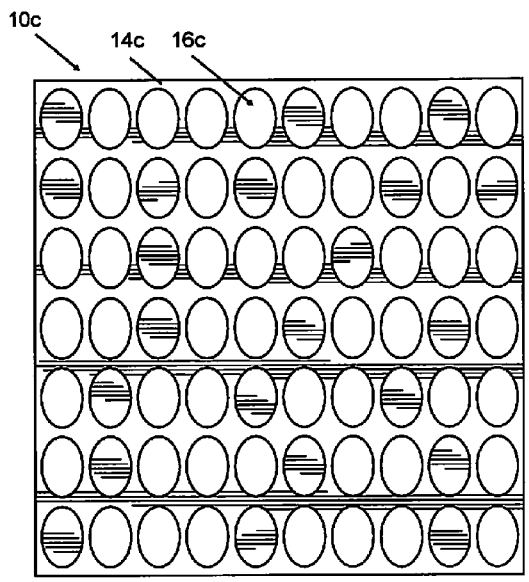
FIG. 15 is a bottom view of another embodiment of a subfloor component.
Figure 17:
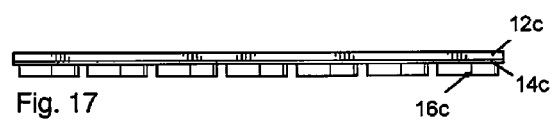
FIG. 17 is an end view of the subfloor component of FIG. 15.
Figure 18:
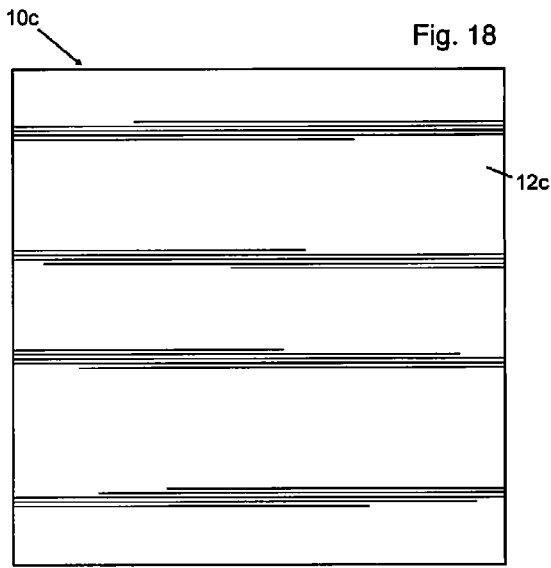
FIG. 18 is a top view of the subfloor component of FIG. 15.
Figure 16:
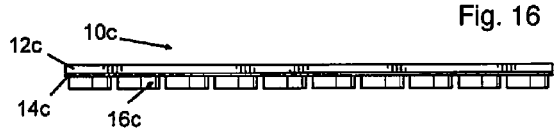
FIG. 16 is a side view of the subfloor component of FIG. 15.
Figure 19:
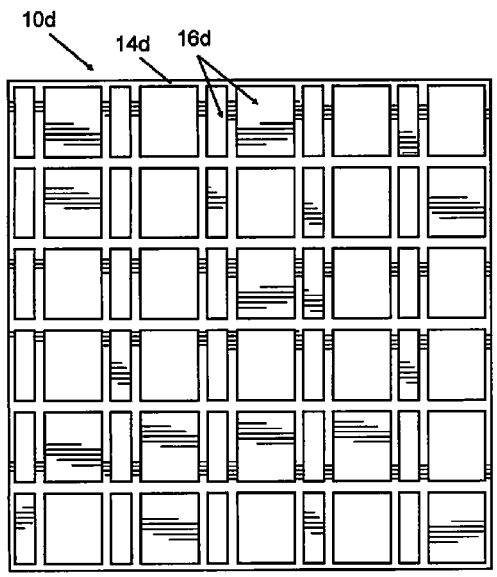
FIG. 19 is a bottom view of another embodiment of a subfloor component.
Figure 21:
FIG. 21 is an end view of the subfloor component of FIG. 19.
Figure 22:
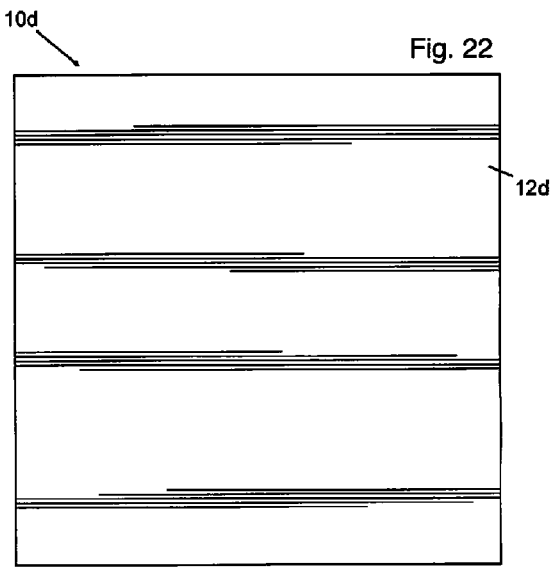
FIG. 22 is a top view of the subfloor component of FIG. 19.
Figure 20:
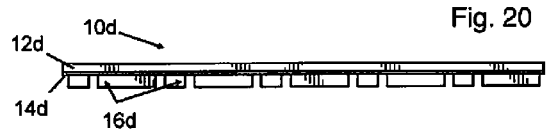
FIG. 20 is a side view of the subfloor component of FIG. 19.
Figure 23:
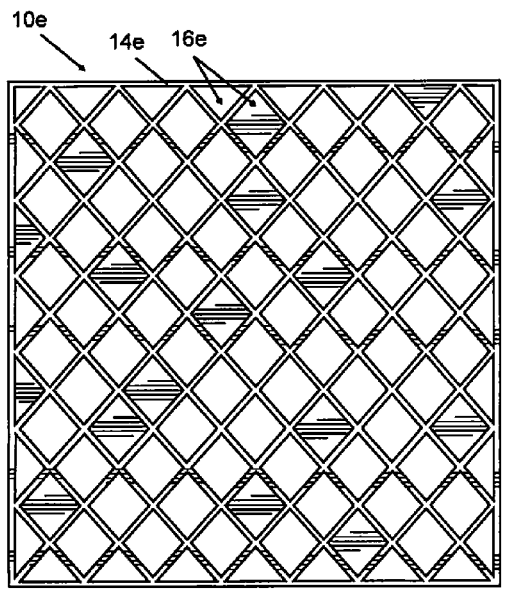
FIG. 23 is a bottom view of another embodiment of a subfloor component.
Figure 24:
FIG. 24 is a side view of the subfloor component of FIG. 22.
Figure 25:
FIG. 25 is an end view of the subfloor component of FIG. 22.
Figure 26:
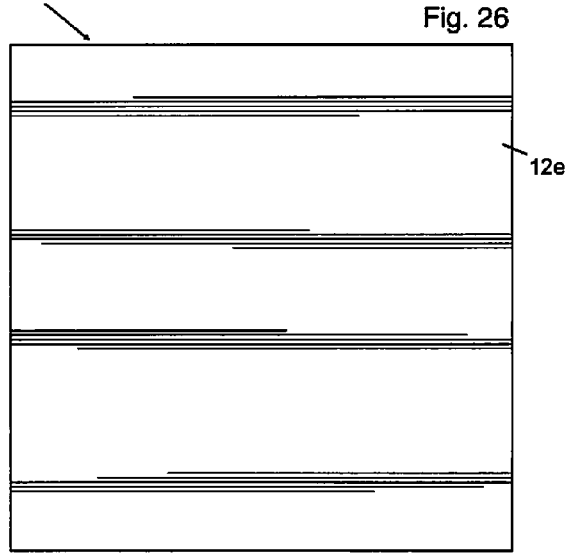
FIG. 26 is a top view of the subfloor component of FIG. 22.
Figure 27:
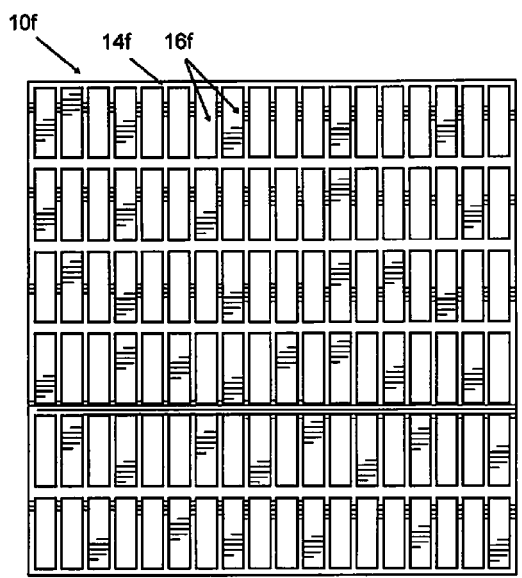
FIG. 27 is a bottom view of another embodiment of a subfloor component.
Figure 29:
FIG. 29 is an end view of the subfloor component of FIG. 28.
Figure 30:
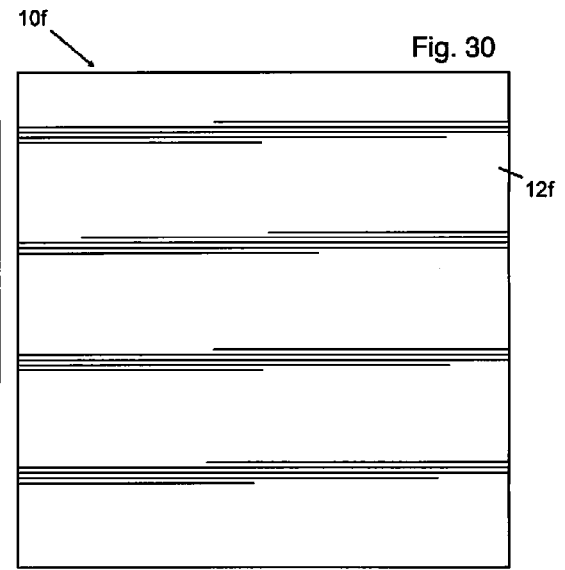
FIG. 30 is a top view of the subfloor component of FIG. 29.
Figure 28:
FIG. 28 is a side view of the subfloor component of FIG. 27.
Figure 31:
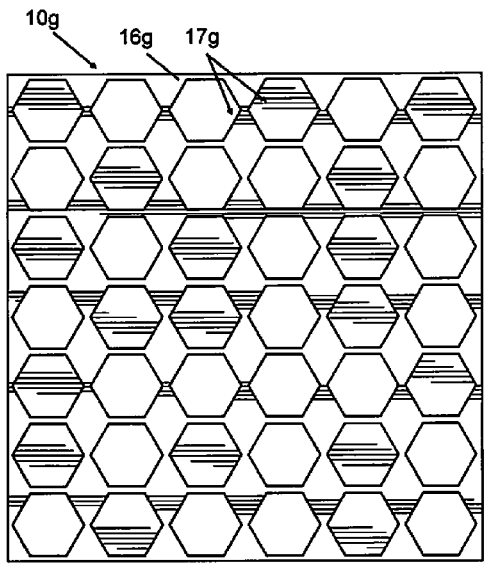
FIG. 31 is a bottom view of another embodiment of a subfloor component.
Figure 33:
FIG. 33 is an end view of the subfloor component of FIG. 31.
Figure 34:
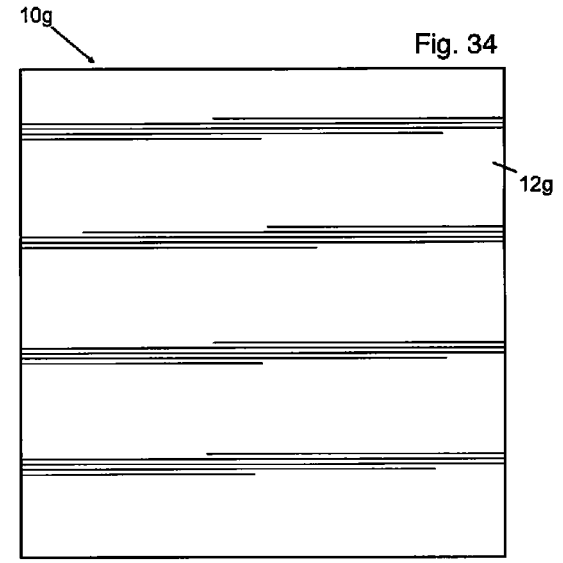
FIG. 34 is a top view of the subfloor component of FIG. 31.
Figure 32:
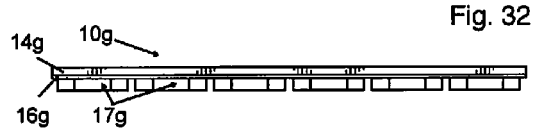
FIG. 32 is a side view of the subfloor component of FIG. 31.

In FIGS. 1 through 5, there is shown a subfloor component 10 according to an embodiment. Subfloor component 10 is rectangular in shape, and includes a hardboard panel 12 and a moisture-resistant film 14. The hardboard panel 12 includes first and second opposing faces. Multiple intersecting grooves in the first face define, in cross-section, multiple pedestals 16 that have walls that extend into the hardboard panel 12 from the first face toward the second face. The moisture-resistant film 14 is attached to the first face of the panel and conforms to the pedestals 16. The second face of the hardboard panel 12 is opposite from the first face and is generally planar.

In this embodiment, the hardboard panel 12 is oriented strand board (OSB), a material well-known to be employed in building construction. Also in this embodiment, the moisture-resistant film 14 is a thin layer of high-impact polystyrene, and is attached to the first face of the hardboard panel 12 by an adhesive layer disposed therebetween. The moisture-resistant film 14 is attached to the hardboard panel 12 such that the moisture-resistant film 14 is affixed to the tops and walls of the pedestals 16 as well as to the bottoms of the grooves.

The subfloor component 10 is to be placed on a foundation floor or other such structure with the pedestals 16 downwards and with the moisture-resistant film 14 between the hardboard panel 12 and the foundation floor. Moisture on the foundation floor is able to pass between the pedestals 16 and can contact the moisture-resistant film 14 in order to drain away from underneath the subfloor component 10. The moisture-resistant film 14 effectively resists the passage of moisture into the hardboard panel 12 from the foundation floor thereby keeping the hardboard panel 12 suitably dry. Thus, it will be understood that the moisture-resistant film 14 is substantially moisture-impervious, meaning that the moisture-resistant film 14 permits only an insignificant amount of moisture, if any, to pass therethrough.

The second face of the hardboard panel 12 is configured to have floor finishing material (not shown) overlaid thereon. The floor finishing material may be hardwood flooring, laminate flooring, tile, linoleum, ceramic, stone, cork, bamboo, eucalyptus and the like. In some embodiments, the floor finishing material may be installed directly onto the second face of the hardboard panel 12.

The attachment of the moisture-resistant film 14 to the hardboard panel 12 enables the pedestals 16 to which the moisture-resistant film is conforming to have increased resistance to breakage. As will be understood, the corners and edges of the OSB can otherwise be prone to chipping or damage. In this embodiment, the pedestals 16, which are shaped as squares, each have four (4) walls meeting at four (4) edges and four (4) top corners. Particularly the top corners and also the edges are most prone to being broken away during transportation, installation, or usage. The present inventor has found that, particularly for a subfloor component 10 that will be experiencing various physical pressures from above, advantages are gained by employing a moisture-resistant film 14 that not only resists moisture reaching the hardboard panel 12 but conforms to the pedestals in order to provide drainage and also increase the structural integrity of the pedestals 16. In this way, physical pressures both during construction (workers, wheel barrows, other machinery) and when construction is complete (home owners, employees, couches, filing cabinets etc.) can be better withstood by the pedestals 16.

In this embodiment, the walls of the intersecting grooves have a height of about 7.5 millimeters, giving the pedestals 16 a corresponding height. However, other heights are possible. For example, other embodiments may provide heights of between about 5 millimeters to about 15 millimeters. Furthermore, in this embodiment, the intersecting grooves have a width of about 15 millimeters, giving the pedestals 16 a corresponding spacing. However, other widths are possible. For example, other embodiments may provide widths of between about 15 millimeters to about 20 millimeters. It will be understood that having all grooves have the same width is not required.

While the above-described subfloor component 10 can be useful for many purposes, the present inventor has also developed additional embodiments. For example, FIGS. 6 through 10 show a subfloor component 10a according to another embodiment. Subfloor component 10a is square in shape, and includes a hardboard panel 12a and a moisture-resistant film 14a. Like the embodiment described in FIGS. 1 through 5, the hardboard panel 12a includes first and second opposing faces. Multiple intersecting grooves in the first face define, in cross-section, multiple pedestals 16a that have walls that extend into the hardboard panel 12a from the first face toward the second face. The moisture-resistant film 14a is attached to the first face of the panel and conforms to the pedestals 16a. The second face of the hardboard panel 12a is opposite from the first face and is generally planar. As can be seen, subfloor component 10a is similar to subfloor component 10, but is square instead of rectangular.

FIGS. 11 through 14 show a subfloor component 10b according to another embodiment. Subfloor component 10b is square in shape, and includes a hardboard panel 12b and a moisture-resistant film 14b. Like the embodiment described in FIGS. 1 through 5, the hardboard panel 12b includes first and second opposing faces. Multiple intersecting grooves in the first face define, in cross-section, multiple pedestals 16b that have walls that extend into the hardboard panel 12b from the first face toward the second face. The moisture-resistant film 14b is attached to the first face of the panel and conforms to the pedestals 16b. The second face of the hardboard panel 12b is opposite from the first face and is generally planar. As can be seen, subfloor component 10b is similar to subfloor component 10, but is square instead of rectangular. Furthermore, each of the pedestals 16b is circular, rather than square. The pedestals 16b being circular means that each pedestal 16b only has one wall, and thus there are no top corners. Because pedestal 16b does not have any top corners, breakage due to handling or use of the subfloor component 10b is even less likely.

FIGS. 15 through 18 show a subfloor component 10c according to another embodiment. Subfloor component 10c is square in shape, and includes a hardboard panel 12c and a moisture-resistant film 14c. Like the embodiment described in FIGS. 1 through 5, the hardboard panel 12c includes first and second opposing faces. Multiple intersecting grooves in the first face define, in cross-section, multiple pedestals 16c that have walls that extend into the hardboard panel 12c from the first face toward the second face. The moisture-resistant film 14c is attached to the first face of the panel and conforms to the pedestals 16c. The second face of the hardboard panel 12c is opposite from the first face and is generally planar. As can be seen, subfloor component 10c is similar to subfloor component 10, but is square instead of rectangular. Furthermore, each of the pedestals 16c is oval-shaped, rather than square. The pedestals 16c being oval-shaped means that each pedestal 16c only has one wall, and thus there are no top corners. Because pedestal 16c does not have any top corners, breakage due to handling or use of the subfloor component 10c is less likely.

FIGS. 19 through 22 show a subfloor component 10d according to another embodiment. Subfloor component 10d is square in shape, and includes a hardboard panel 12d and a moisture-resistant film 14d. Like the embodiment described in FIGS. 1 through 5, the hardboard panel 12d includes first and second opposing faces. Multiple intersecting grooves in the first face define, in cross-section, multiple pedestals 16d that have walls that extend into the hardboard panel 12d from the first face toward the second face. The moisture-resistant film 14d is attached to the first face of the panel and conforms to the pedestals 16d. The second face of hardboard panel 12a is opposite from the first face and is generally planar. As can be seen, subfloor component 10d is similar to subfloor component 10, but is square instead of rectangular. Furthermore, there are two different sizes of pedestals 16d, namely a thin rectangle and a thick rectangle.

FIGS. 23 through 26 show a subfloor component 10d according to another embodiment. Subfloor component 10e is square in shape, and includes a hardboard panel 12e and a moisture-resistant film 14e. Like the embodiment described in FIGS. 1 through 5, the hardboard panel 12e includes first and second opposing faces. Multiple intersecting grooves in the first face define, in cross-section, multiple pedestals 16e that have walls that extend into the hardboard panel 12e from the first face toward the second face. The moisture-resistant film 14e is attached to the first face of the panel and conforms to the pedestals 16e. The second face of the hardboard panel 12e is opposite from the first face and is generally planar. As can be seen, subfloor component 10e is similar to subfloor component 10, but is square instead of rectangular. Furthermore, the pedestals 16e are diamond-shaped.

FIGS. 27 through 30 show a subfloor component 10f according to another embodiment. Subfloor component 10f is square in shape, and includes a hardboard panel 12f and a moisture-resistant film 14f. Like the embodiment described in FIGS. 1 through 5, the hardboard panel 12f includes first and second opposing faces. Multiple intersecting grooves in the first face define, in cross-section, multiple pedestals 16f that have walls that extend into the hardboard panel 12f from the first face toward the second face. The moisture-resistant film 14f is attached to the first face of the panel and conforms to the pedestals 16f. The second face of the hardboard panel 12f is opposite from the first face and is generally planar. As can be seen, subfloor component 10f is similar to subfloor component 10, but is square instead of rectangular. Furthermore, the pedestals 16f are all rectangles.

FIGS. 31 through 34 show a subfloor component 10g according to another embodiment. Subfloor component 10g is square in shape, and includes a hardboard panel 12g and a moisture-resistant film 14g. Like the embodiment described in FIGS. 1 through 5, the hardboard panel 12g includes first and second opposing faces. Multiple intersecting grooves in the first face define, in cross-section, multiple pedestals 16g that have walls that extend into the hardboard panel 12g from the first face toward the second face. The moisture-resistant film 14g is attached to the first face of the panel and conforms to the pedestals 16g. The second face of the hardboard panel 12g is opposite from the first face and is generally planar. As can be seen, subfloor component 10g is similar to subfloor component 10, but is square instead of rectangular. Furthermore, the pedestals 16g are all hexagons.

It will be understood that a subfloor component with pedestals of different shapes, including others not disclosed above, or mixtures of differently-shaped pedestals such as those described above, may be provided.

The various subfloor components described herein may generally be used alongside each other in a particular installation, provided that the overall thicknesses of two different panels are similar, and provided that using differently-shaped pedestals in two different subfloor components does not unduly impede the flow of moisture beneath the subfloor components. In one embodiment, the hardboard panel of adjacent subfloor components have tongue and groove configurations along the sides which abut against each other, such that the tongue of one panel can be received within the groove of the adjacent panel. The tongues/grooves may have square, rectangular configurations with or without rounded distal corners.

Figure 35:
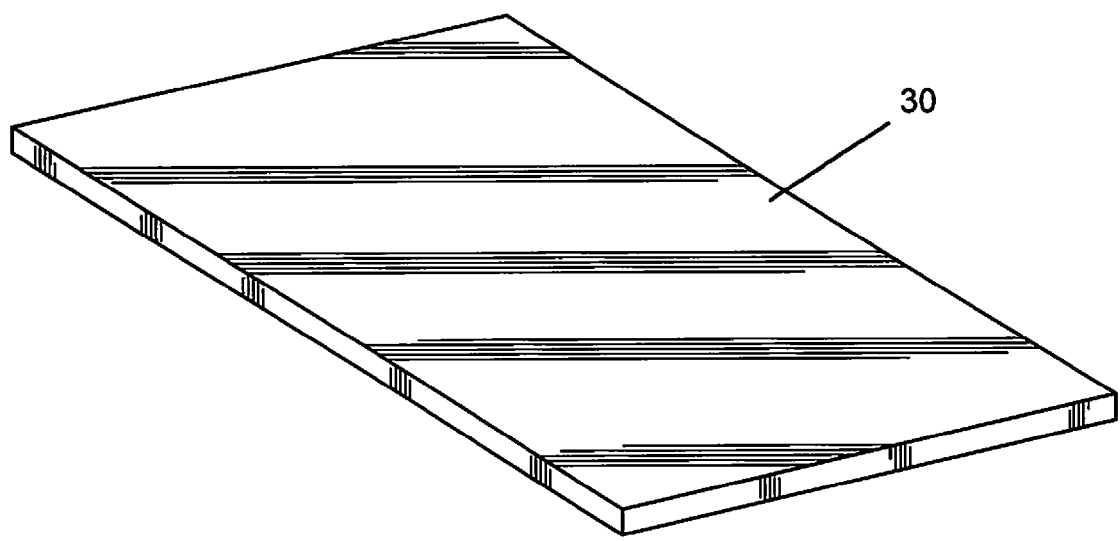
FIG. 35 is a perspective view of a hardboard sheet used to form the hardboard panel during manufacture of the subfloor component of FIG. 1.
Figure 36:
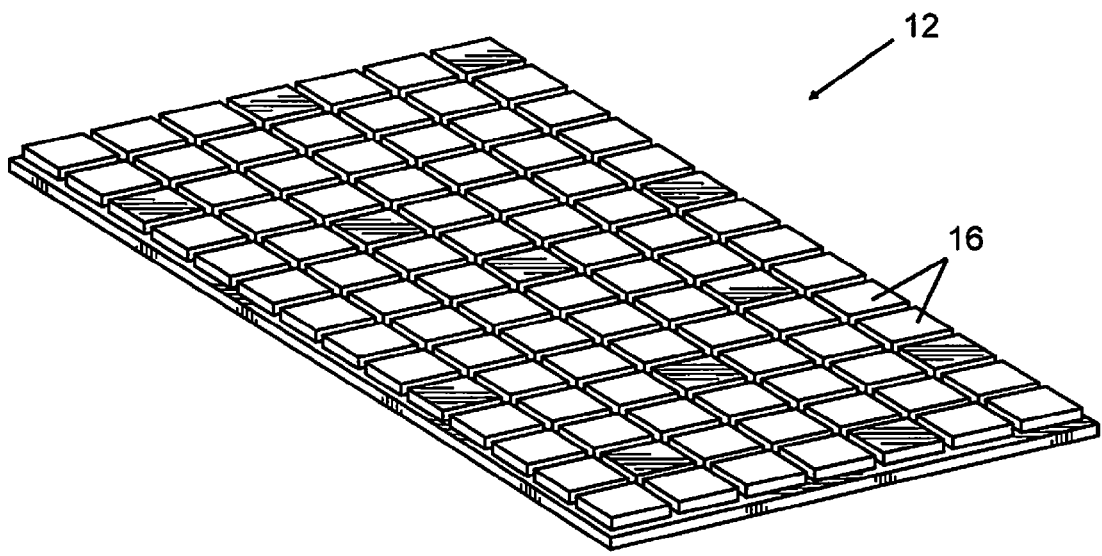
FIG. 36 is a perspective view of the hardboard panel shaped from the hardboard sheet of FIG. 35.
Figure 37:
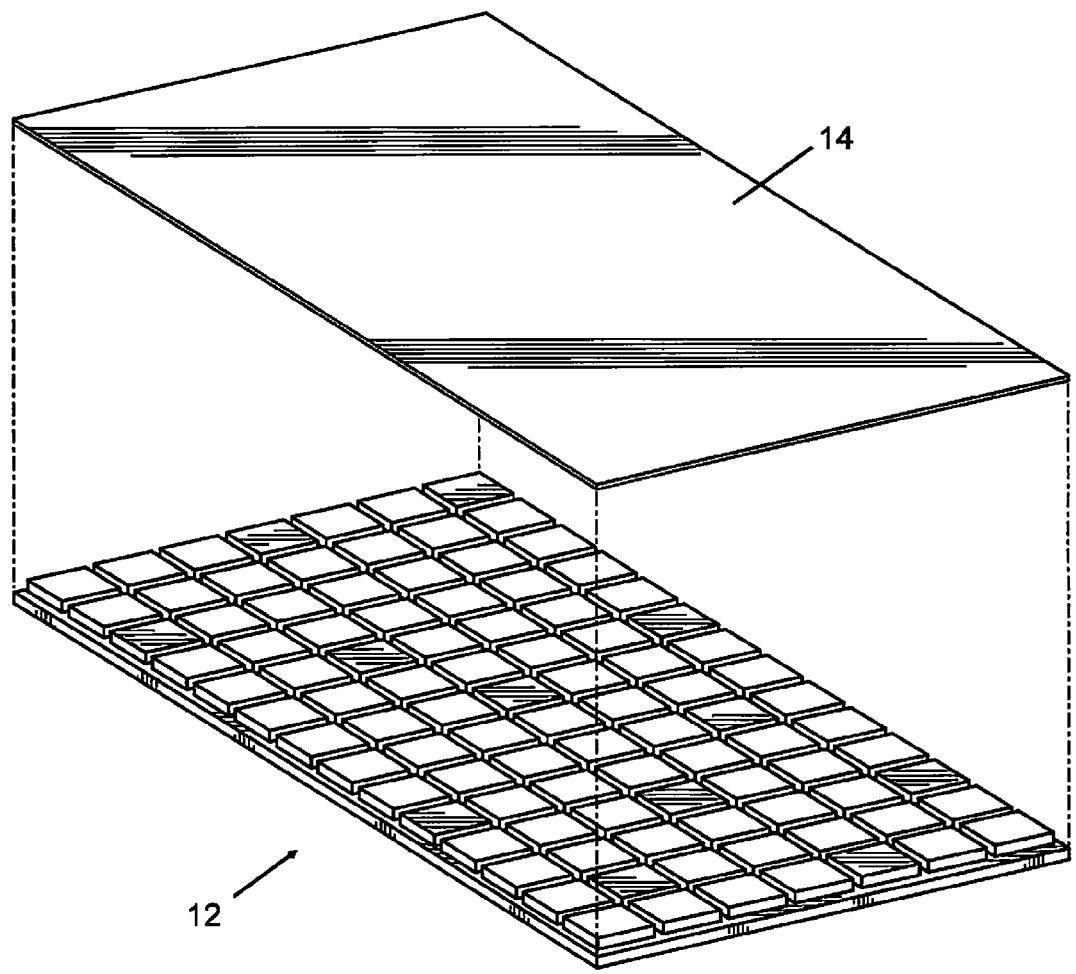
FIG. 37 is a perspective view of a moisture-resistant film being placed against the hardboard panel of FIG. 36.
Figure 38:
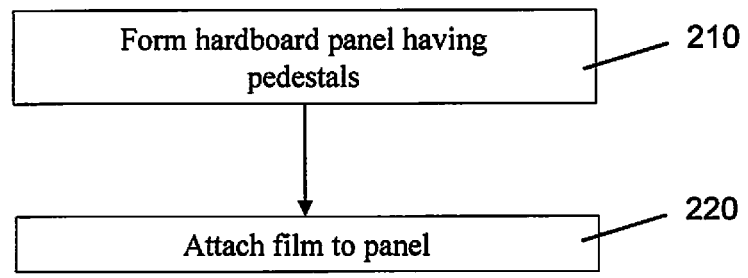
FIG. 38 is a flowchart of steps of a method for manufacturing the subfloor component of FIG. 1.

FIG. 38 shows a flowchart of steps of a method of manufacturing a subfloor component such as subfloor component 10 described above. The treatment of the materials involved in the steps is illustrated in FIGS. 35 to 37. In FIG. 35, a hardboard sheet 30 of OSB having generally flat, opposing faces is provided. The hardboard sheet 30 is then shaped using a suitable tool (not shown) to create the multiple intersecting grooves on one face, so as to define the pedestals 16 and thereby form the hardboard panel 12 (step 210), shown in FIG. 36. The tool may be, for example, a router, a table saw, a milling machine, and the like.

A generally flat piece of moisture-resistant film 14 is then attached to the first face of the hardboard panel 12 (step 220), shown in FIG. 37. In this embodiment, one or both of the hardboard panel 12 and the moisture-resistant film 14 has an adhesive layer (not shown) disposed thereon. The adhesive layer may be a layer of glue, for example. The moisture-resistant film 14 is then brought into contact with the first face of the hardboard panel 12, and in such a manner that the moisture-resistant film 14 enters into and conforms to the pedestals 16 of the hardboard panel 12. The adhesive layer(s) adhere the moisture-resistant film 14 to the hardboard panel 12, thereby forming the subfloor component 10.

In other embodiments, other methods may be used to attach the moisture-resistant film 14 to the first face of the hardboard panel 12. For example, the moisture-resistant film 14 may be fused to the hardboard panel 12 using heat. In this embodiment, a generally-flat piece of moisture-resistant film 14 is placed adjacent the tops of the pedestals 16 of the hardboard panel 12. Here, it will be understood that the moisture-resistant film 14 may be placed in contact with and/or in non-contact proximity with the tops of the pedestals 16 of the hardboard panel 12. Heat is then applied to one or both of the moisture-resistant film 14 and the hardboard panel 12, so as to cause the moisture-resistant film 14 to enter into and conform to the pedestals 16 of the hardboard panel 12. The moisture-resistant film being of high-impact polystyrene fuses at its surface under the applied heat to the facing surface of the hardboard panel 12, and thereby forms the subfloor component 10. During this step, the heat may be applied by any suitable heat source, such as for example a hot air blower, one or more heating elements, an oven, and the like.

In still other embodiments, the moisture resistant film may be attached to the first face of the hardboard panel 12 by spray coating. For example, in one embodiment, a layer of polystyrene is deposited onto the first face of the hardboard panel 12 using a suitable spraying tool. The spraying tool may be, for example, a compressed air spray gun.

As discussed above, subfloor components 10 may be laid adjacent to each other on a concrete floor or other foundation as described above. This may be done without connecting the subfloor components 10 to each other. However, as discussed, advantages lie in connecting adjacent subfloor components 10 in some manner so as to resist movement of the adjacent subfloor components 10 relative to one another.

Although in embodiments described above, the subfloor components have tongue and groove configurations along the sides which abut against each other, in other embodiments, other configurations may be used. For example, in other embodiments, the subfloor components may alternatively have grooves along the sides, and with each groove being configured to receive a connector for connecting adjacent subfloor components. The connector may be, for example, a longitudinal connector strip comprising a central body and opposing tongues, with each tongue being shaped to be received by a respective groove.

Figure 39:
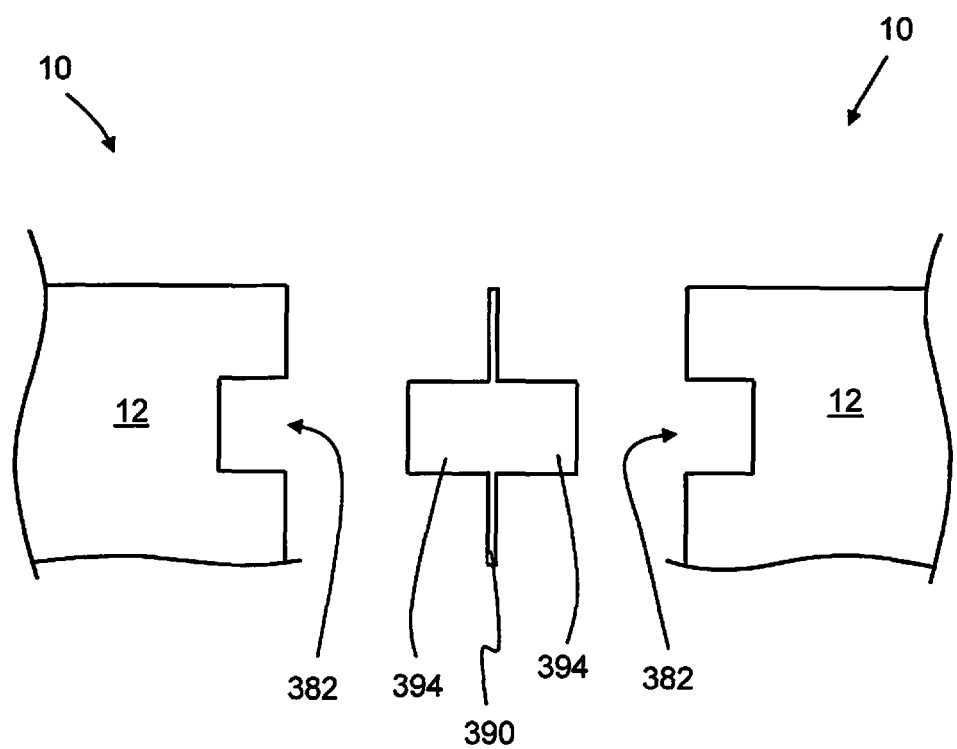
FIG. 39 is an exploded side view of a portion two subfloor components according to another embodiment, and a connector strip therebetween.

For example, FIG. 39 shows two adjacent subfloor components 10, each subfloor component 10 including a hardboard panel 12 and a moisture-resistant film 14 (not shown). The hardboard panel 12 includes first and second opposing faces, with multiple intersecting grooves in the first face defining, in cross-section, multiple pedestals (not shown), as in subfloor component 10 described above and with reference to FIGS. 1 to 5. Each hardboard panel 12 has two (2) grooves 382 formed therein on opposing sides. In this embodiment, the adjacent subfloor components 10 are configured to be connected by a connector in the form of a longitudinal connector strip 390 having a length extending into the page. The connector strip 390 comprises a thin central body and two (2) opposing tongues 394 extending therefrom, with each tongue 394 being shaped to be received by a respective groove 382 and having a thickness that provides frictional engagement with the inside of the groove 382 for connecting the adjacent subfloor components 10.

Each of the ends of hardboard panels 12 may be recessed slightly, so as to accommodate the thin central body of the connector strip 390 in a way that permits the hardboard panels 12 to generally contact each other despite the insertion of the connector strip 390 between the hardboard panels 12.

The connector strip 390 may be made of plastic, metal, or one or more other suitable materials, and may be a unitary device or be made of two or more interconnected pieces.

The length of the connector strip 390 may be less than, the same as, or greater than the corresponding length of a particular subfloor component 10. As will be understood, the connector strip 390 functions to align the hardboard layers 12 and to thereby keep the adjacent subfloor components 10 into which it is inserted from significantly shifting relative to each other thereby providing a more unitary subfloor, and generally on the same plane as each other.

In another alternative configuration, one or both of the opposing tongues 394 of the connector strip may alternatively have barbs extending therefrom for frictionally engaging, or "gripping", the insides of the groove(s) 382 to help with resisting of sliding of the connector strip relative to the subfloor components. As will be understood, such a barbed configuration would make it easy for an installer to insert a connector strip into grooves.

In another alternative configuration, a connector may be provided that has no central body but that simply consists of tongues 394.

Although in the embodiment shown in FIG. 39, there are grooves formed along two (2) opposing sides of the hardboard panel, in other embodiments, there may alternatively be grooves formed along the four (4) sides of the hardboard panel.

The many features and advantages of the invention are apparent from the detailed specification and, thus, it is intended by the appended claims to cover all such features and advantages of the invention that fall within the true purpose of the invention. Further, since numerous modifications and changes will readily occur to those skilled in the art, it is not desired to limit the invention to the exact operation illustrated and described, and accordingly all suitable modifications and equivalents may be resorted to, falling within the purpose and scope of the invention.

For example, the moisture-resistant film may be made of other materials, such as polyethylene, polypropylene, or ABS (Acrylonitrile Butadiene Styrene). Furthermore, materials for the hardboard panel may be selected from plywood, fiber cement board, cement board, and magnesium oxide board. Other materials, provided that they provide a suitable amount of rigidity, may be employed for the hardboard panel.

Furthermore, while in the embodiments disclosed above the pedestals are generally uniformly distributed across the hardboard panel, alternatives may be provided having pedestals that are not so uniformly distributed.

Although embodiments have been described above with reference to the accompanying drawings, those of skill in the art will appreciate that variations and modifications may be made without departing from the scope thereof as defined by the appended claims.

What is claimed is:

1. A subfloor component comprising:
   a hardboard panel having first and second opposing faces and a plurality of intersecting grooves to define, in cross-section, a plurality of pedestals having walls that extend into the panel from the first face toward the second face; and
   a film of substantially moisture-impervious material attached to the first face of the panel and that conforms to the tops and walls of the pedestals and to the bottoms of the grooves.

2. The subfloor component of claim 1, wherein the film is attached to the panel by an adhesive layer.

3. The subfloor component of claim 1, wherein the film is fused to the panel.

4. The subfloor component of claim 1, wherein the film is spray coated onto the panel.

5. The subfloor component of claim 1, wherein the film comprises material selected from the group comprising plastic or polymer.

6. The subfloor component of claim 5, wherein the plastic or polymer is selected from the group consisting of: high-impact polystyrene, polyethylene, polypropylene, and ABS (Acrylonitrile Butadiene Styrene).

7. The subfloor component of claim 1, wherein each of the plurality of pedestals has a single wall.

8. The subfloor component of claim 7, wherein the pedestals are shaped as circles or ellipses.

9. The subfloor component of claim 1, wherein the intersecting grooves are rectangular.

10. The subfloor component of claim 1, wherein the pedestals are shaped as at least one of circles, ellipses, rectangles, diamonds, squares, and hexagons.

11. The subfloor component of claim 1, wherein the pedestals are generally uniformly distributed across the first surface of the panel.

12. The subfloor component of claim 1, wherein the hardboard panel comprises material selected from the group consisting of: OSB (oriented strand board), plywood, fiber cement board, cement board, and magnesium oxide board.

13. The subfloor component of claim 1, wherein the second face of the panel is configured to have floor finishing material overlaid thereon.

14. The subfloor component of claim 1, wherein the subfloor component is shaped to connect to another subfloor component.

15. The subfloor component of claim 14, wherein the hardboard panel comprises a tongue/groove configuration for connecting to another hardboard panel of another subfloor component.

16. The subfloor component of claim 14, wherein the hardboard panel includes a groove that is open along a side-facing surface of the hardboard panel, further comprising:
   a connector dimensioned to insert into the groove.

17. The subfloor component of claim 16, wherein the connector comprises:
   a central body; and
   tongues extending outwards from the central body, wherein each tongue is dimensioned to be inserted into a respective groove in a hardboard panel of a subfloor component.

18. A method of manufacturing a subfloor component, comprising:
   shaping a hardboard sheet to form a hardboard panel having, in cross-section, a plurality of pedestals with walls that extend into the panel from a first face of the panel toward a second opposing face of the panel; and
   attaching a substantially moisture-impervious film to the first face of the panel, the film conforming to the tops and walls of the pedestals and to the bottoms of the grooves.

19. The method of claim 18, wherein attaching the film comprises one of:
   adhering the film to the first face of the panel using an adhesive layer;
   spray coating the film onto the first face of the panel; or
   placing the film adjacent the first face of the panel, and applying heat to one or both of the film and the panel, so as to cause the film to enter into and conform to the pedestals and fuse thereto.

20. The method of claim 19, wherein said placing comprises placing the film in contact with and/or in non-contact proximity with the first face of the panel.

* * * * *